(12) United States Patent
Miyazaki

(10) Patent No.: US 7,733,527 B2
(45) Date of Patent: Jun. 8, 2010

(54) IMAGE PROCESSING DEVICE, IMAGE OUTPUT DEVICE, TERMINAL DEVICE, AND IMAGE FORMING SYSTEM AND COMPUTER READABLE MEDIUM STORING PROGRAM THEREOF

(75) Inventor: Koichi Miyazaki, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 560 days.

(21) Appl. No.: 11/723,024

(22) Filed: Mar. 15, 2007

(65) Prior Publication Data

US 2008/0055678 A1 Mar. 6, 2008

(30) Foreign Application Priority Data

Sep. 1, 2006 (JP) ............... 2006-237444

(51) Int. Cl.
*H04N 1/60* (2006.01)
*H04N 1/46* (2006.01)
*G06K 9/00* (2006.01)
*G06K 9/34* (2006.01)
*G06K 9/46* (2006.01)

(52) U.S. Cl. ............... 358/1.9; 358/515; 358/517; 358/518; 358/523; 358/540; 382/162; 382/163; 382/167; 382/170; 382/173; 382/176; 382/178; 382/190

(58) Field of Classification Search ............... 358/1.9, 358/515, 518, 517, 523; 382/162, 167, 163, 382/170, 173, 176, 178, 190
See application file for complete search history.

(56) References Cited

U.S. PATENT DOCUMENTS

| | | | |
|---|---|---|---|
| 5,315,381 A | 5/1994 | Yamashita et al. | |
| 5,331,440 A | 7/1994 | Kita et al. | |
| 5,719,956 A | 2/1998 | Ogatsu et al. | |
| 6,480,623 B1 * | 11/2002 | Yagishita et al. | ............ 382/163 |
| 7,340,092 B2 * | 3/2008 | Tanaka et al. | ............... 382/170 |
| 2003/0133607 A1 | 7/2003 | Goto et al. | |
| 2004/0257596 A1 | 12/2004 | Mestha et al. | |

FOREIGN PATENT DOCUMENTS

| | | |
|---|---|---|
| JP | A 7-288706 | 10/1995 |
| JP | A 10-248017 | 9/1998 |
| JP | A 2000-165693 | 6/2000 |
| JP | A-2004-122692 | 4/2004 |
| JP | A-2004-237584 | 8/2004 |
| JP | A-2005-094551 | 4/2005 |
| JP | A-2005-123976 | 5/2005 |
| JP | A 2005-292220 | 10/2005 |

* cited by examiner

*Primary Examiner*—Charlotte M Baker
(74) *Attorney, Agent, or Firm*—Oliff & Berridge, PLC

(57) ABSTRACT

An image processing device includes a separation unit that separates image information including a first image having plural color components and a second image having a specific color component and to be overlaid at least in part on the first image into a specific color component image of the same color component as the specific color component and an image with color components other than the specific color component among the plural color components; a color conversion unit that performs color conversion of the image with color components other than the specific color component, separated by the separation unit; and a combination unit that combines the color-converted image with color components other than the specific color component, converted by the color conversion unit, and the specific color component image separated by the separation unit.

19 Claims, 12 Drawing Sheets

FIG. 1
TRAPPING
BACKGROUND
(SPREADING)
BLACK CHARACTER
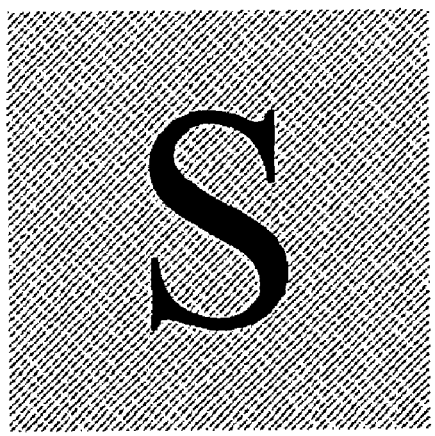
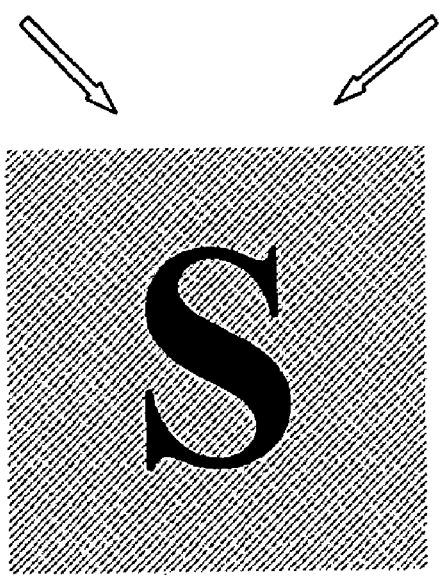

FIG. 2
OVERPRINTING
BACKGROUND
(WITHOUT WHITE BLANK)   BLACK CHARACTER
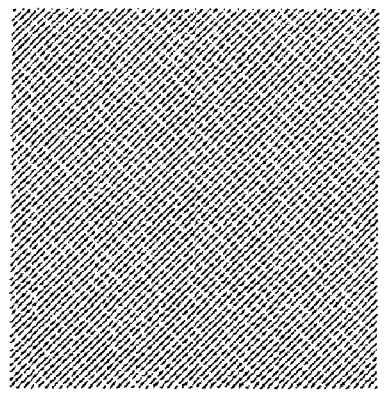
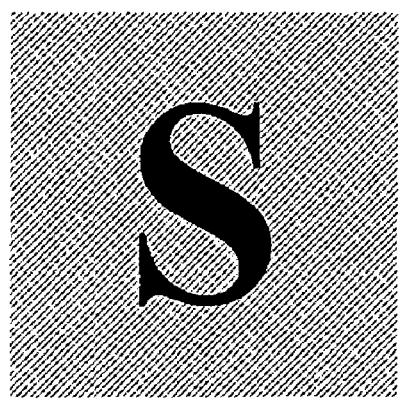

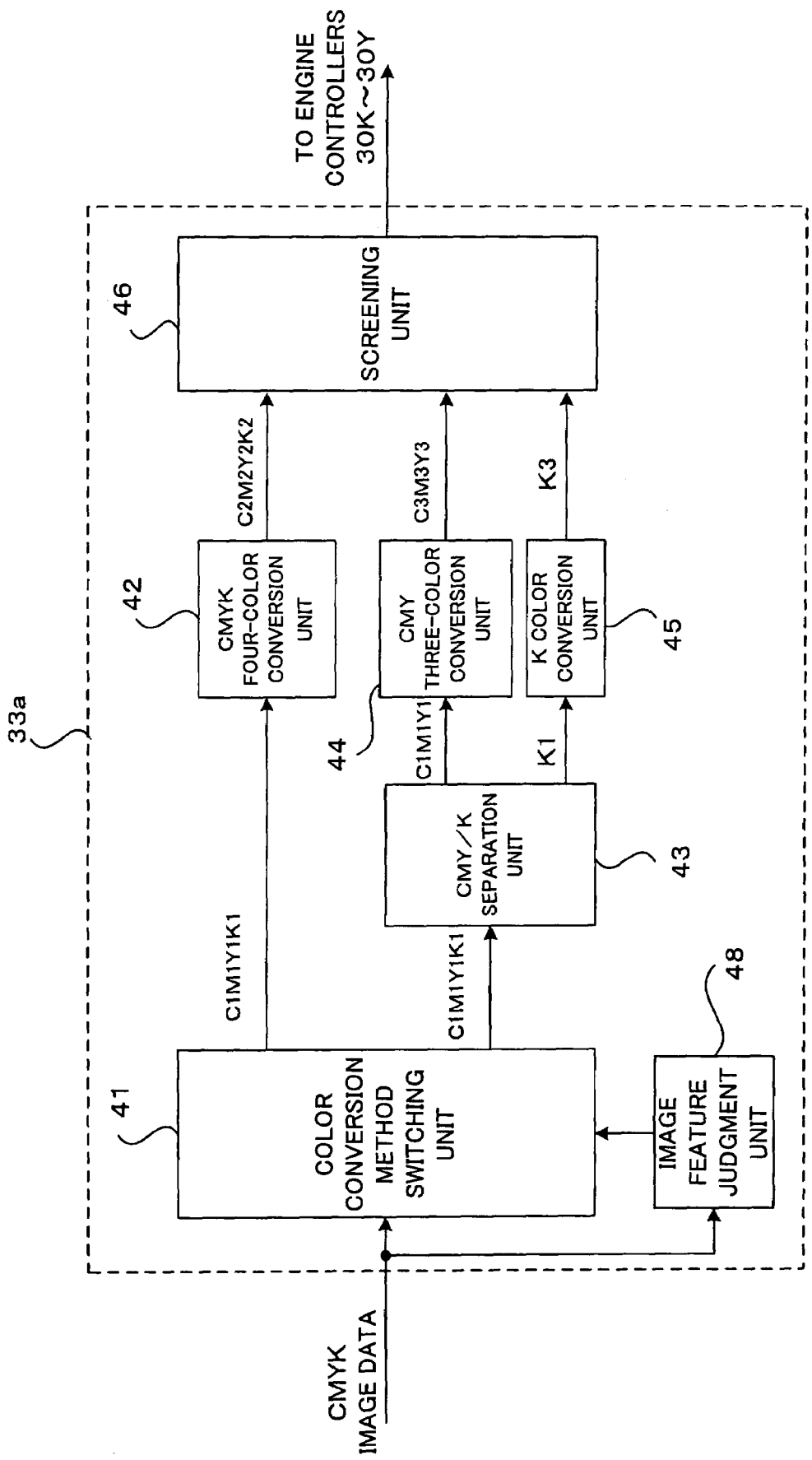

IMAGE PROCESSING DEVICE, IMAGE OUTPUT DEVICE, TERMINAL DEVICE, AND IMAGE FORMING SYSTEM AND COMPUTER READABLE MEDIUM STORING PROGRAM THEREOF

BACKGROUND

1. Technical Field

The present invention relates to an image processing device, an image output device, a terminal device, and an image forming system and a computer readable medium storing a program thereof.

2. Related Art

Trapping is a processing method which, when printing two adjacent images, makes either of the adjacent images a bit larger so that the images are partially overlapped when printed. Specifically, as is illustrated in FIG. 1, by spreading a background image (choking a white blank portion), this method makes an overlap of a black character image onto the background image. If an image including a black character object and its background manipulated by such trapping is printed, white edges will not appear even if, for example, printing misregistration occurs, as is illustrated in FIG. 1.

Overprinting is a processing method in which no white blank area is provided in the background, as is illustrated in FIG. 2. This overprinting also produces a print result in which white edges do not appear even if, for example, printing misregistration occurs, as is illustrated in FIG. 2.

However, when color conversion such as CMYK-CMYK conversion is performed on an image manipulated by the above trapping, overprinting, and the like, such a phenomenon as will be described below occurs.

For example, consider a case where color conversion is performed on an image in which a black character image (K) is overlaid on a background image whose color is composed of a combination of colors (C1, M1, Y1), as is illustrated in FIG. 3A; in this state, pixel values in a region where the black character image is superposed on the background image are C1, M1, Y1, K and pixel values in a region where only the background image exists are C1, M1, Y1, 0.

Through color conversion for the pixels in the region where only the background image exists, the pixel values of C1, M1, Y1, 0 are converted to C2, M2, Y2, 0, as illustrated in FIG. 4A. Through color conversion for the pixels in the region where the black character image is superposed on the background image, the pixel values of C1, M1, Y1, K are converted to C3, M3, Y3, K, as illustrated in FIG. 4B. Color conversion from CMYK image data to CMYK image data is performed such that each set of all combinations of the values of the four colors of CMYK is replaced by the corresponding set among the combinations of replacement CMYK values which are predefined. Thus, the sets having even the same CMY values, but plus a different value of K, are converted to the sets in which different CMY values are assigned.

Consequently, as illustrated in FIG. 3B, some portions of the background image are converted to C2, M2, Y2 and other portion thereof is converted to C3, M3, Y3, depending on whether the black character exists on the background, and these portions become to have different hues in the color-converted image.

SUMMARY

The present invention is intended to provide an image processing device, an image output device, a terminal device, an image forming system, and a computer readable medium storing a program thereof, which are capable of properly performing color conversion of image information including a first image having plural color components (e.g., a background image having YMCK color components) and a second image having a specific color component and to be overlaid at least in part on the first image (e.g., a black character image having a K color component).

[Image Processing Device]

A first aspect of the present invention resides in an image processing device including:

a separation unit that separates image information including a first image having plural color components and a second image having a specific color component and to be overlaid at least in part on the first image into a specific color component image of the same color component as the specific color component and an image with color components other than the specific color component among the plural color components;

a color conversion unit that performs color conversion of the image with color components other than the specific color component, separated by the separation unit; and a combination unit that combines the color-converted image with color components other than the specific color component, converted by the color conversion unit, and the specific color component image separated by the separation unit.

BRIEF DESCRIPTION OF THE DRAWINGS

Exemplary embodiments of the present invention will be described in detail based on the following figures, wherein:

FIG. 1 is an illustration to explain trapping;

FIG. 2 is an illustration to explain overprinting;

FIG. 12 is a block diagram showing a configuration of an image processing device 33a according to a second exemplary embodiment of the present invention.

DETAILED DESCRIPTION

Exemplary embodiments of the present invention will now be described in detail with reference to the drawings.

First Exemplary Embodiment

Figure 3A:
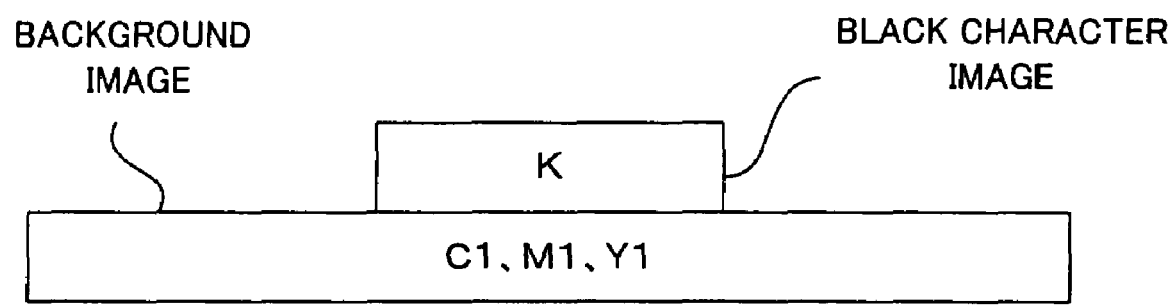
FIGS. 3A and 3B illustrate the result of CMYK-CMYK color conversion for an image subjected to overprinting.
Figure 3B:
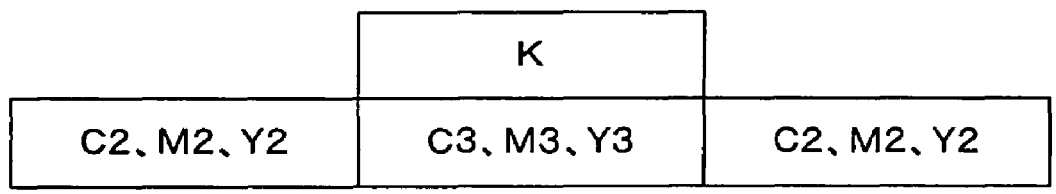
Figure 4A:
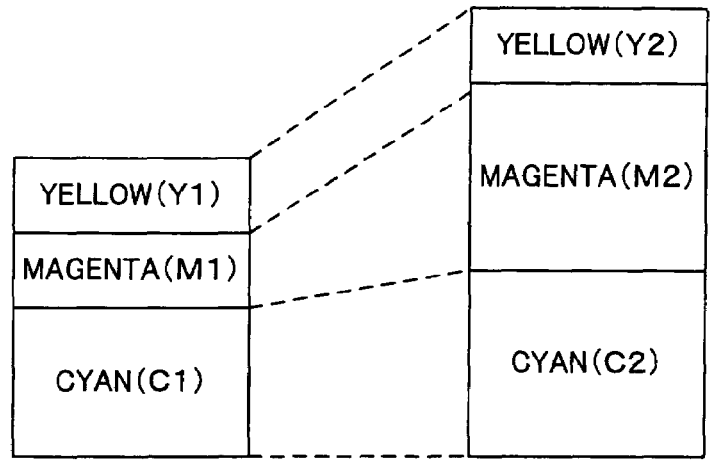
FIGS. 4A and 4B illustrate color conversion of the portions of a background image to different colors depending on the superposition of a black character thereon.
Figure 4B:
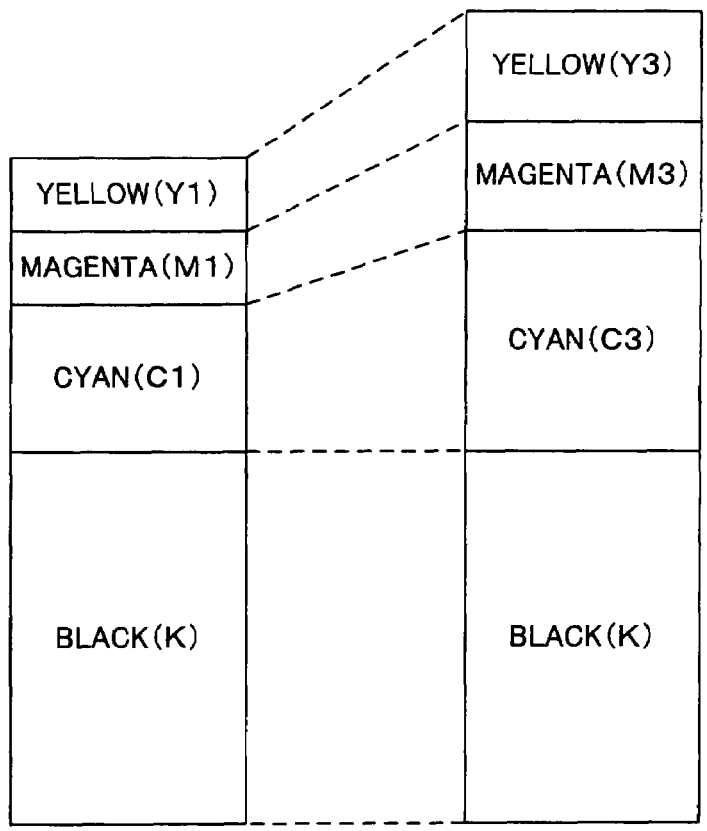
Figure 5:
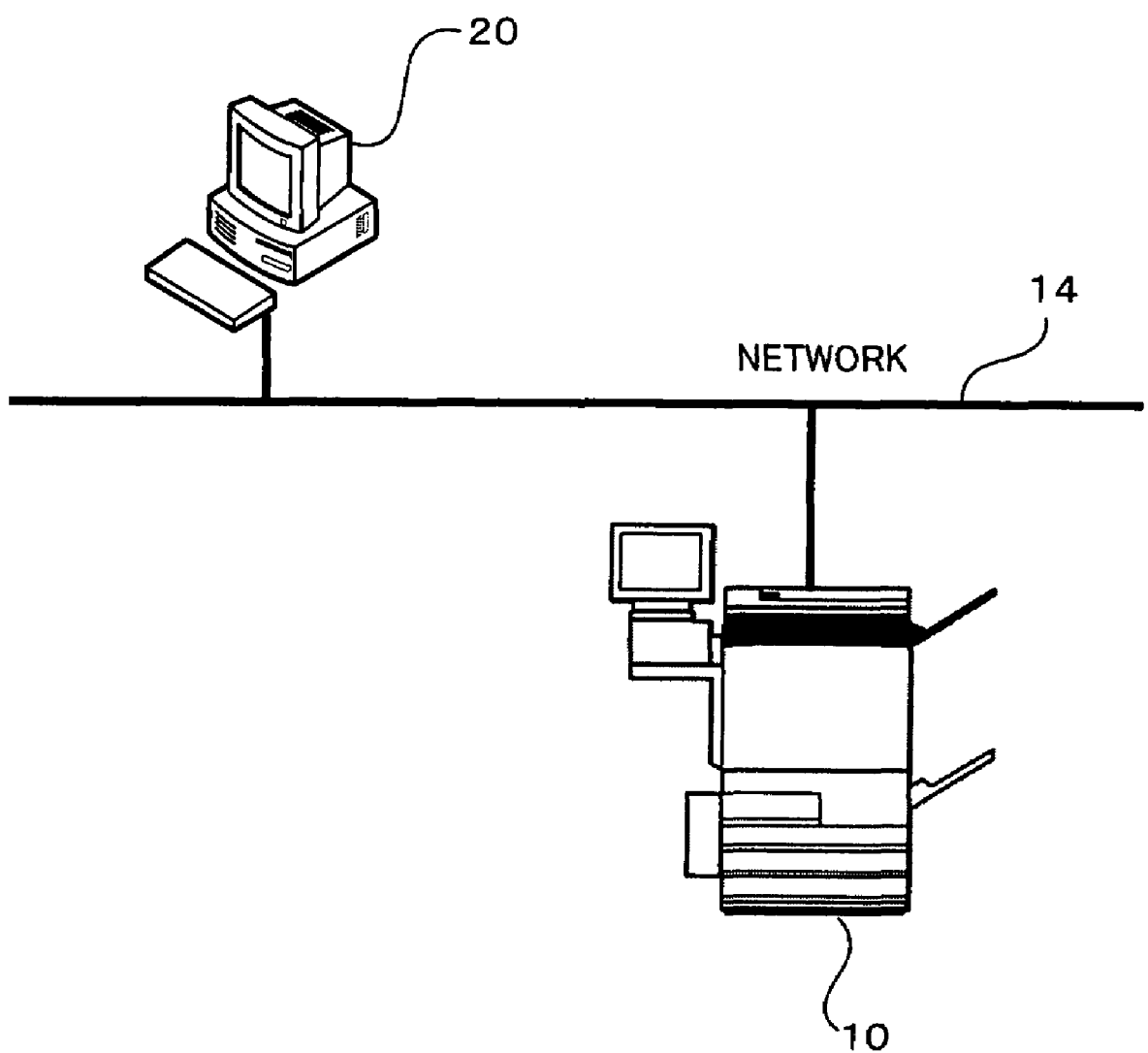
FIG. 5 is a diagram showing a schematic of an image forming system including an image forming apparatus 10 according to a first exemplary embodiment of the present invention.

FIG. 5 is a diagram showing a schematic of an image forming system including an image forming apparatus 10 according to a first exemplary embodiment of the present invention.

As shown in FIG. 5, the image forming system includes the image forming apparatus 10 and a terminal device 20 which are connected via a network 14. The terminal device 20 generates printing data such as printing jobs and transmits image data which will later be subjected to color conversion to the image forming apparatus 10. The image forming apparatus 10 receives the printing data transmitted from the terminal device 20 and outputs an image corresponding to the printing data on printing paper.

Figure 6:
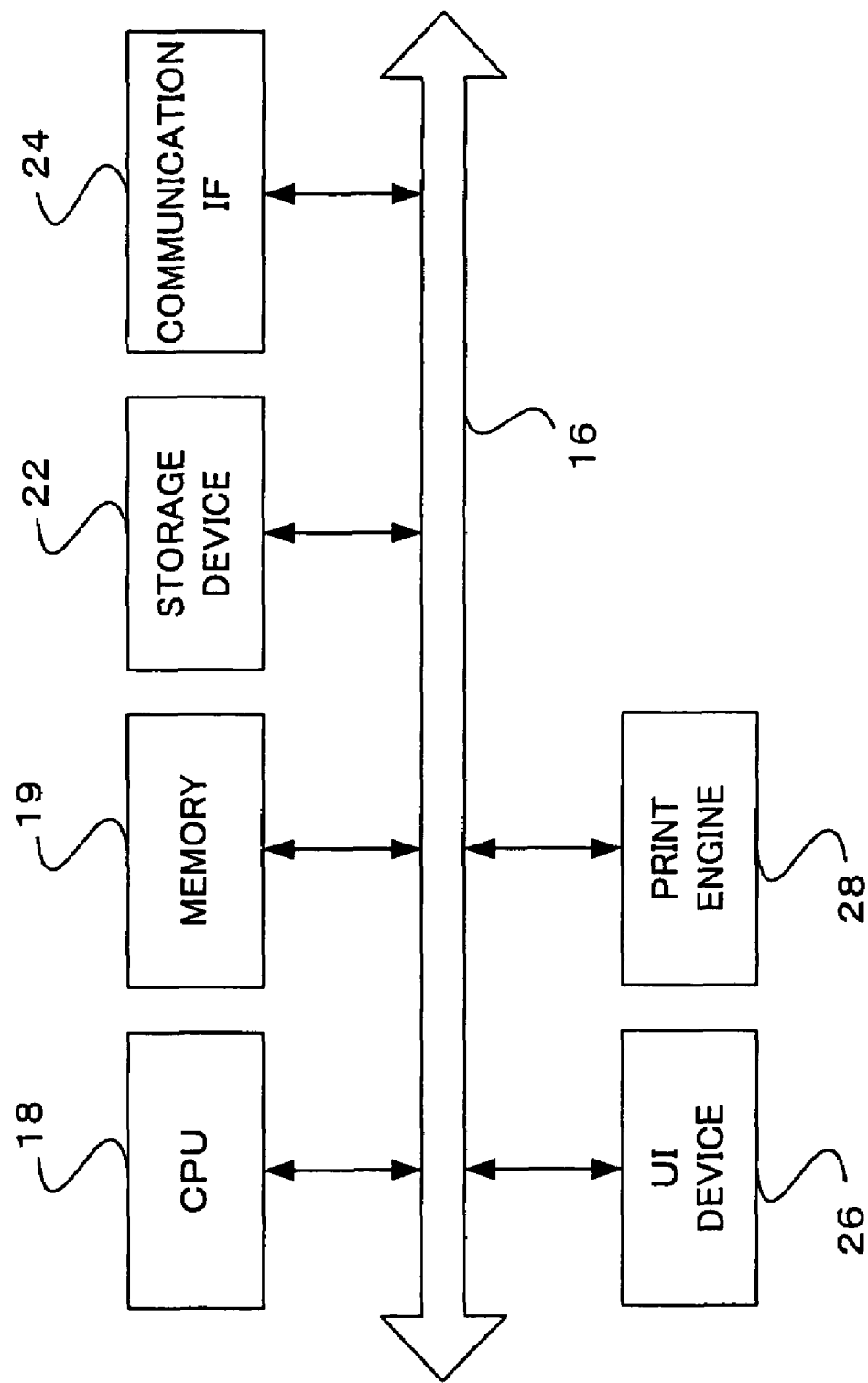
FIG. 6 is a diagram showing a hardware structure of the image forming apparatus 10 according to the first exemplary embodiment of the present invention.

Next, a hardware structure of the image forming apparatus 10 of the present exemplary embodiment is shown in FIG. 6.

The image forming apparatus 10, as shown in FIG. 6, includes a CPU 18, a memory 19, a storage device 22 such as a hard disk drive (HDD), a communication interface (IF) 24 which transmits and receives data to/from an external computer or the like via the network 14, a user interface (UI) device 26 including a tough panel or a liquid crystal display and a keyboard, and a print engine 28. These components are interconnected via a control bus 16.

The CPU 18 performs prejudged processes based on an image processing program embodied in a computer readable medium and stored in the memory 19 or the storage device 22 and controls the operation of the image forming apparatus 10. The image processing program may be distributed from an external source via the communication interface IF 24 or stored in a storage medium such as a CD-ROM and distributed.

Figure 7:
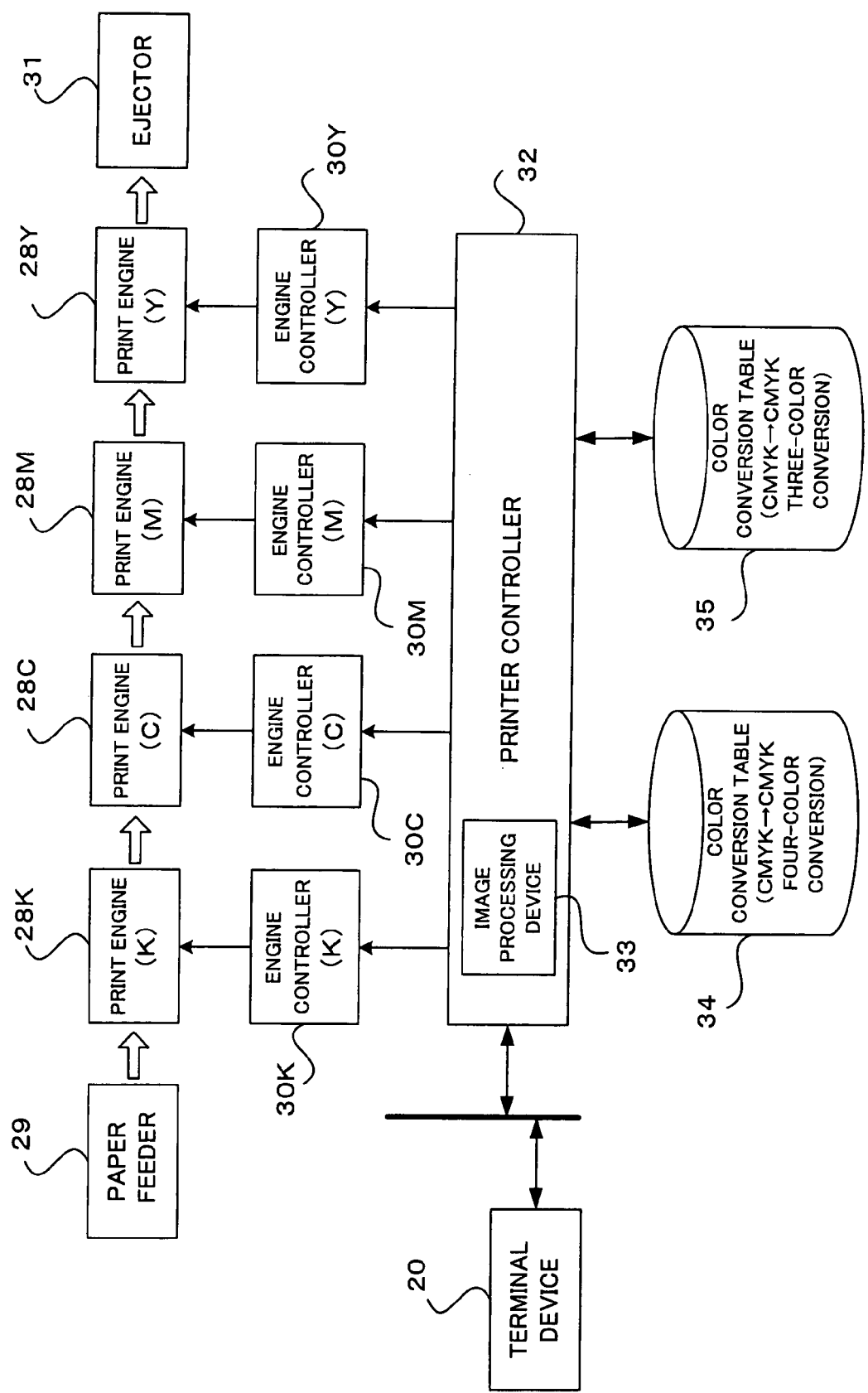
FIG. 7 is a block diagram showing an arrangement of functions of the image forming apparatus 10 according to the first exemplary embodiment of the present invention.

FIG. 7 is a block diagram showing an arrangement of functions of the image forming apparatus 10 and these functions are realized by the execution of the above image processing program.

The image forming apparatus 10 of the present exemplary embodiment, as shown in FIG. 7, is equipped with a paper feeder 29, print engines 28K to 28Y, engine controllers 30K to 30Y, an ejector 31, a printer controller 32, a color conversion table 34 for CMYK-CMYK four-color conversion, and a color conversion table 35 for CMY-CMY three-color conversion. Within the printer controller 32, an image processing device 33 for image processing on image data to be printed is configured.

The engine controllers 30K to 30Y respectively control the operations of the print engines 28K to 28Y. The print engines 28K to 28Y respectively perform printing based on printing data for each color of YMCK on printing paper fed from the paper feeder 29 and output the print result to the ejector 31. The print engines 28K to 28Y function as image output devices that output an image based on image data having color data converted by the image processing device 33.

Next, the configuration of the image processing device 33 in FIG. 7 is described with reference to FIG. 8.

Figure 8:
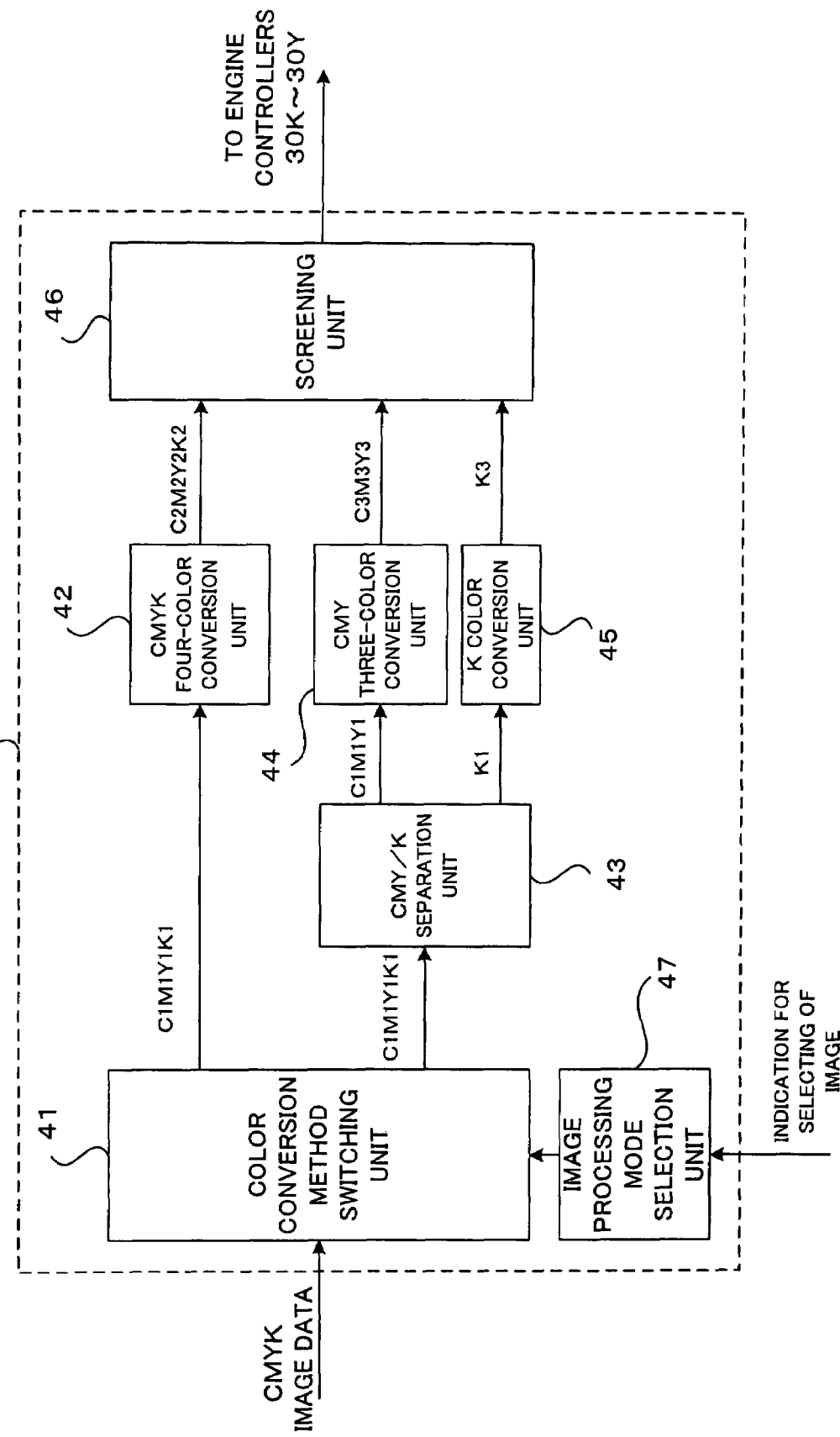
FIG. 8 is a block diagram showing a configuration of an image processing device 33 in FIG. 7.

The image processing device 33 in the present exemplary embodiment, as shown in FIG. 8, is provided with a color conversion method switching unit 41, a CMYK four-color conversion unit 42, a CMY/K separation unit 43, a CMY three-color conversion unit 44, a K color conversion unit 45, a screening unit 46, and an image processing mode selection unit 47.

The image processing mode selection unit 47 receives an indication of user-entered selection as to whether to perform image processing that gives priority to the quality of a photographic image or to perform image processing that gives priority to the quality of an image having a character area and a background area such as the images of business document pages and maps. In particular, the image processing mode selection unit 47 receives information as to whether the attribute of CMYK image data to be subjected to color conversion is a photographic image or an image having a character area and a background area.

Here, the photographic image is an image obtained by taking an image of an object by an image capturing device and this image does not include a region in which an extreme change in grayscale appears. The image having a character area and a background area is an image created artificially by a computer or the like and this image includes a region in which a steep change in grayscale appears.

Based on the selection made by the image processing mode selection unit 47, the color conversion method switching unit 41 switches between two paths for supplying CMYK image data (C1M1Y1K1) to be subjected to color conversion; that is, one path to the CMYK four-color conversion unit 42 or the other path to the CMY/K separation unit 43. Specifically, if image processing that gives priority to the quality of a photographic image is selected by image processing mode selection unit 47, the color conversion method switching unit 41 supplies the CMYK image data (C1M1Y1K1) to be subjected to color conversion to the CMYK four-color conversion unit 42. If image processing that gives priority to the quality of an image having a character area and a background area is selected by the image processing mode selection unit 47, the color conversion method switching unit 41 supplies the CMYK image data (C1M1Y1K1) to be subjected to color conversion to the CMY/K separation unit 43.

The CMYK four-color conversion unit 42 functions as a color conversion part for photographic images and performs color conversion on image data having four colors of CMYK supplied from the color conversion method switching unit 41, using the color conversion table (CMYK-CMYK four-color conversion) 34 shown in FIG. 7.

The CMY/K separation unit 43 separates image data having four colors of CMYK supplied from the color conversion method switching unit 41 into image data having three colors of CMY and image data having a K color.

The CMY three-color conversion unit 44 performs color conversion on the image data having three colors of CMY separated by the CMY/K separation unit 43, using the color conversion table (CMY-CMY three-color conversion) 35 shown in FIG. 7.

The K color conversion unit 45 performs color conversion on the image data having a K color separated by the CMY/K separation unit 43, using a color conversion table which is not shown.

The screening unit 46 transforms the color-converted CMYK image data (C2M2Y2K2) converted by the CMYK four-color conversion unit 42 or CMYK image data (C3M3Y3K3) into which the color-converted CMY image data (C3M3Y3) converted by the CMY three-color conversion unit 44 and the color-converted K image data converted by the K color conversion unit 45 have been combined into binary image data and outputs the binary image data to the engine controllers 30K to 30Y.

Figure 9:
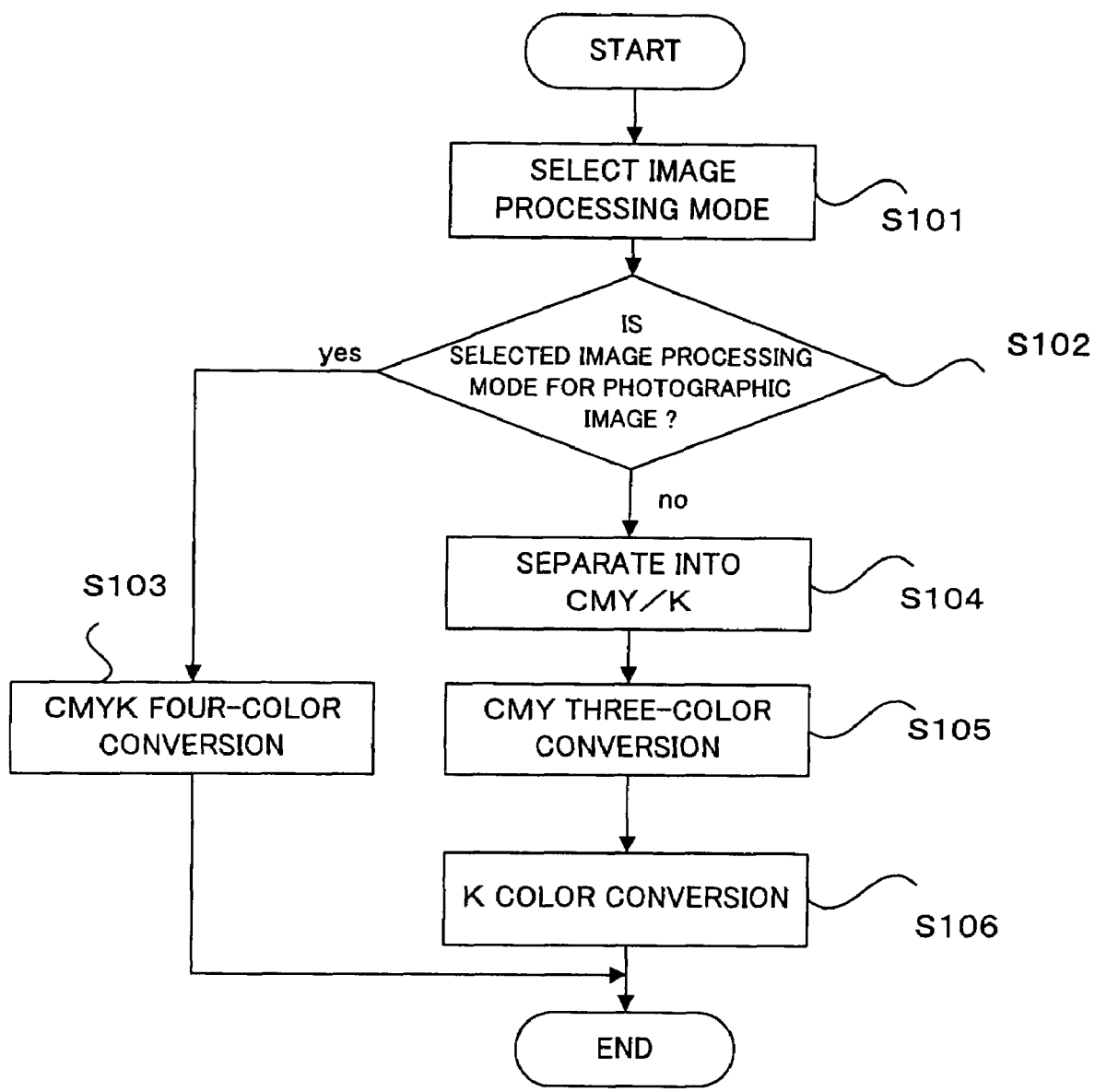
FIG. 9 is a flowchart describing the operation of the image processing device 33 according to the first exemplary embodiment of the present invention.

Next, referring to a flowchart of FIG. 9, the operation of the image processing device of the present exemplary embodiment is described in detail.

First, a user selects either image processing that gives priority to the quality of a photographic image or image processing that gives priority to the quality of an image having a character area and a background area for image data to be subjected to color conversion and the selection is indicated to the image processing mode selection unit 47 (S101). Specifically, the image processing mode selection unit 47 receives the attribute of input CMYK image data from the user.

Then, the color conversion method switching unit 41 judges whether the image processing mode selected by the image processing mode selection unit 47 is for a photographic image or for an image having a character area and a background area (S102).

If the selected image processing mode is for a photographic image, as judged at step 102, the color conversion method switching unit 41 supplies the CMYK image data to be subjected to color conversion to the CMYK four-color conversion unit 42. Thus, CMYK-CMYK four-color conversion is performed on the image data by the CMYK four-color conversion unit 42 and color-converted CMYK image data (C2M2Y2K2) is output to the screening unit 46 (S103).

If the selected image processing mode is for an image having a character area and a background area, as judged at S102, the color conversion method switching unit 41 supplies the CMYK image data to be subjected to color conversion to the CMY/K separation unit 43. Thus, the CMYK image data (C1M1Y1K1) to be subjected to color conversion is separated into image data having three colors of CMY (C1M1Y1) and image data having a K color (K1) (S104).

The image data having three colors of CMY (C1M1Y1) separated by the CMY/K separation unit 43 is color-converted by the CMY three-color conversion unit 44 and color-converted CMY image data (C3M3Y3) is output to the screening unit 46 (S105).

Then, the image data having a K color (K1) separated by the CMY/K separation unit 43 is color-converted by the K color conversion unit 45 and color-converted image data (K3) is output to the screening unit 46 (S106).

Figure 10A:
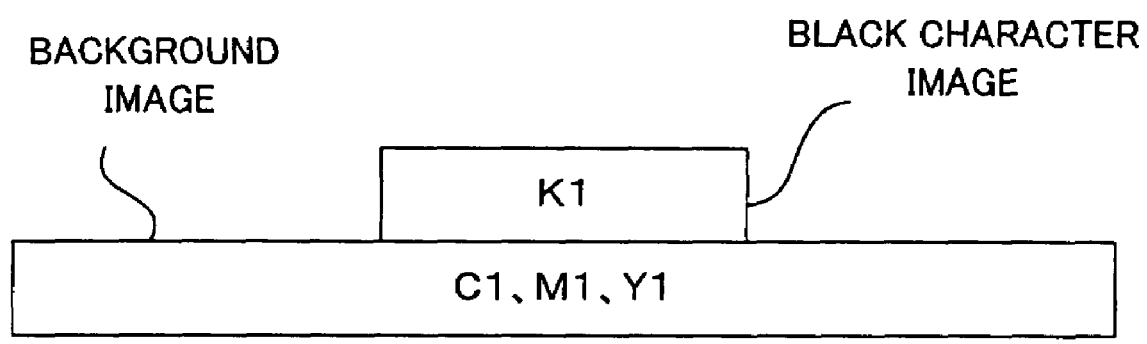
FIGS. 10A and 10B illustrate the result of color conversion by the image processing device of the first exemplary embodiment of the present invention for an image having a character area and a background area subjected to overprinting.
Figure 10B:
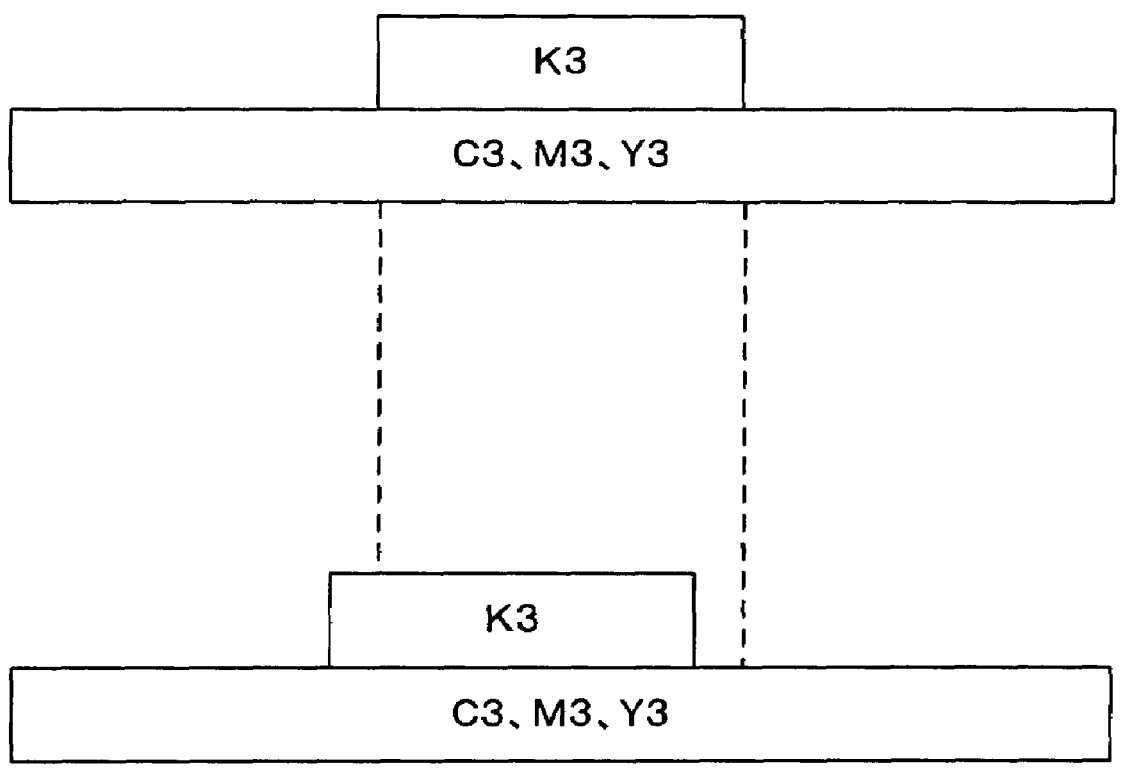

Next, for an image having a character area and a background area, subjected to overprinting, the result of color conversion by the CMY three-color conversion unit 44 and color conversion by the K color conversion unit 45 which are performed separately is illustrated in FIGS. 10A and 10B.

FIG. 10A schematizes a cross section of the image having a character area and a background area before subjected to color conversion. Referring to FIG. 10A, it can be seen that a black character (K1) is overlaid on the background whose color is composed of C1, M1, Y1.

For this image having a character area and a background area shown in FIG. 10A, after the image processing mode for an image having a character area and a background area is selected, when CMYK-CMYK color conversion is performed by the image processing device of the present exemplary embodiment the background image is color-converted to C3, M3, Y3 and the black character image is color-converted to K3, as shown in FIG. 10B.

Figure 11A:
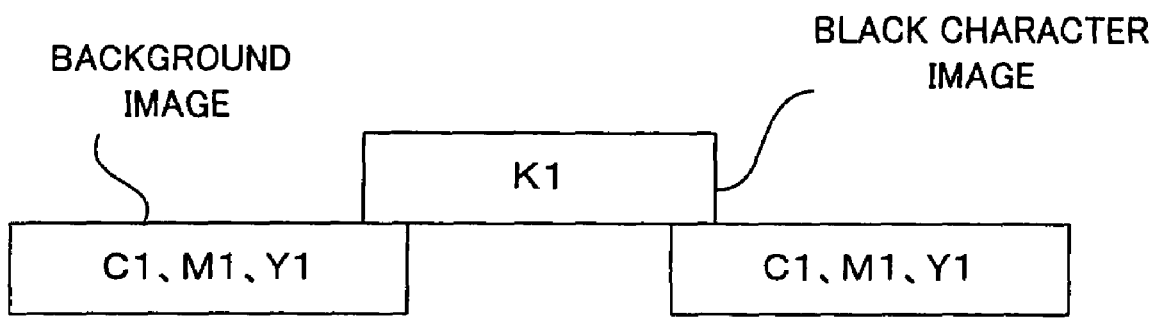
FIGS. 11A and 11B illustrate the result of color conversion by the image processing device of the first exemplary embodiment of the present invention for an image having a character area and a background area subjected to trapping.
Figure 11B:
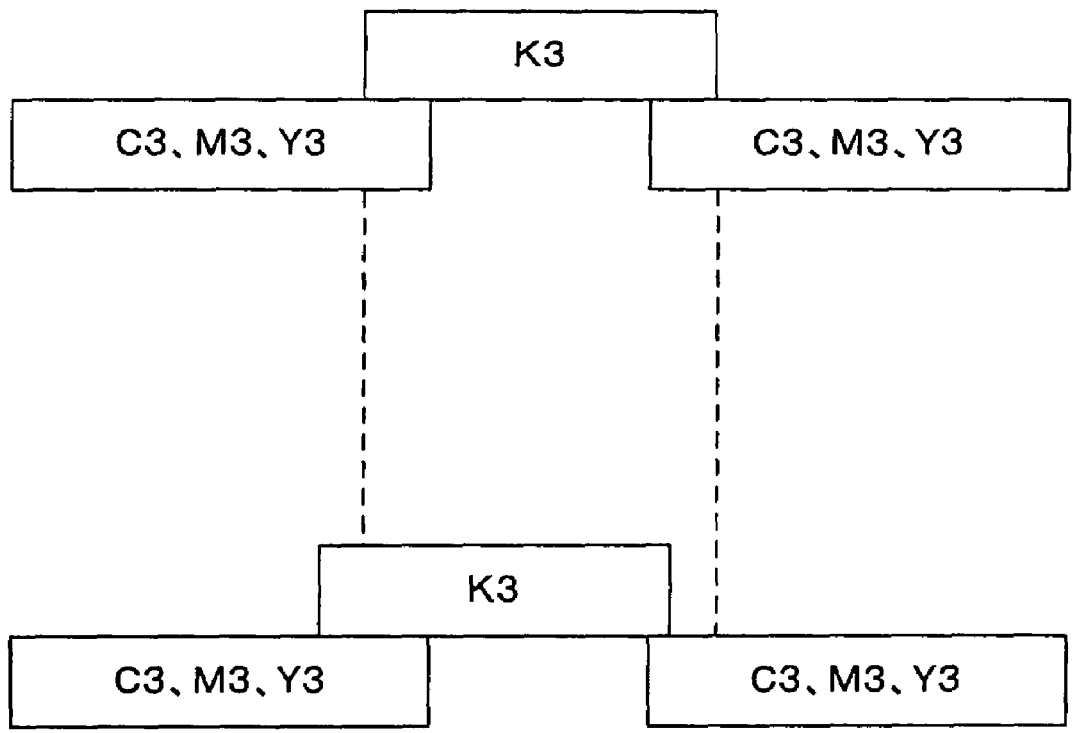

For an image having a character area and a background area, subjected to trapping, the result of color conversion by the CMY three-color conversion unit 44 and color conversion by the K color conversion unit 45 which are performed separately is illustrated in FIGS. 11A and 11B.

FIG. 11A schematizes a cross section of the image having a character area and a background area before subjected to color conversion. Referring to FIG. 11A, it can be seen that a black character (K1) is partially overlaid on the background whose color is composed of C1, M1, Y1.

For this image having a character area and a background area shown in FIG. 11A, after the image processing mode for an image having a character area and a background area is selected, when CMYK-CMYK color conversion is performed by the image processing device of the present exemplary embodiment, the background image is color-converted to C3, M3, Y3 and the black character image is color-converted to K3, as shown in FIG. 11B.

It should be noted that the CMY three-color conversion unit 44 performs color conversion on image data having color components other than the K color which is the color of the character area. In this way, for an image having a character area and a background area, color conversion is performed so that, after the color conversion, there appears no color difference between a background area on which the character area is superposed and a background area on which the character area is not superposed.

No color difference between a background area on which the character area is superposed and a background area on which the character area is not superposed after the color conversion broadly means substantially uniform hue that can visually sensed, not restricted to completely consistent color.

Second Exemplary Embodiment

Next, an image forming apparatus according to a second exemplary embodiment of the present invention is described.

An image processing device 33a in the image forming apparatus according to the second exemplary embodiment of the present invention is shown in FIG. 12.

The image processing device 33a in the present exemplary embodiment, as shown in FIG. 12, has an image feature judgment unit 48 instead of the image processing mode selection unit 47 in addition to other components of the image processing device 33 in the first exemplary embodiment shown in FIG. 8. In FIG. 12, the same components as those shown in FIG. 8 are assigned the same reference numerals and their description is not repeated.

The image feature judgment unit 48 judges the attribute of input CMYK image data and judges whether the image to be subjected to color conversion is an image having a character area and a background area or a photographic image. In particular, the image feature judgment unit 48 judges whether the input image data is a photographic image or an image having a character area and a background area by use of, for example, edge extraction or similar processing.

The terminal device 10 shown in FIG. 5 may be equipped with a part for transmitting attribute information of image data to the image processing device 33 and the image feature judgment unit 48 may judge the attribute of input CMYK image data based on the attribute information received from the terminal device 10.

Based on the judgment made by the image feature judgment unit 48, the color conversion method switching unit 41 in the present exemplary embodiment switches between two paths for supplying CMYK image data (C1M1Y1K1) to be subjected to color conversion; one path to the CMYK four-color conversion unit 42 or the other path to the CMY/K separation unit 43. Specifically, if the image attribute judged by the image feature judgment unit 48 is a photographic image, the color conversion method switching unit 41 supplies the CMYK image data (C1M1Y1K1) to be subjected to color conversion to the CMYK four-color conversion unit 42. If the image attribute judged by the image feature judgment unit 48 is an image having a character area and a background area, the color conversion method switching unit 41 supplies the CMYK image data (C1M1Y1K1) to be subjected to color conversion to the CMY/K separation unit 43.

In the image processing device 33a of the present exemplary embodiment, the judgment as to whether an image represented by input image data is a photographic image or an image having a character area and a background area is made by the image feature judgment unit 48, but other operation is the same as the operation of the image processing device 33 of the first exemplary embodiment shown in FIG. 8; therefore, its description is not repeated.

Modification Examples

In the foregoing exemplary embodiment, because a character area is assumed to have the color of K, for an image having a character area and a background area, only the image data for the K color is separated from the image data having four colors of YMCK and color conversion of the image data for the K color as a specific color and color conversion of the image data having three colors of YMC are performed separately. However, the present invention is not limited to such a case. If a character is colored in another specific color, the described image processing device may be adapted to separate that specific color data from the image data having the four colors of YMCK and perform color conversion of the image data having the remaining three colors and color conversion of the image data for the specific color separately.

There may be other methods for implementing color conversion so as to avoid a hue difference between a region where the character area is not overlaid within the background area and a region where the character image is overlaid within the background area. Various modifications are conceivable. For example, color conversion may be performed based on a color conversion table in which color conversion is not affected by a specific color (K color), so that, in a color-converted image, there appears no hue difference between a region where the character area is not overlaid within the background area and a region where the character image is overlaid within the background area. Alternatively, color conversion that causes a hue difference between a region where the character area is not overlaid within the background area and a region where the character image is overlaid within the background area may be performed and the hue difference may be corrected for uniformity. Alternatively, a consistent value of a specific color component may be assigned to image information for the whole image area to avoid a hue difference between a region where the character area is not overlaid within the background area and a region where the character image is overlaid within the background area.

Furthermore, image data to be converted by color conversion is not limited to CMYK four-color image data and the invention can similarly be applied to color conversion of plural-color image data such as RGB image data.

The image processing device described in the foregoing exemplary embodiments can be applied to any image forming system in which color conversion of image data is performed, not only applied to the image forming apparatus.

The present invention may be embodied in other specific forms without departing from its spirit or characteristics. The described exemplary embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. An image processing device, comprising:
    a separation unit that separates image information including a first image having a plurality of color components and a second image having a specific color component and to be overlaid at least in part on the first image into a specific color component image of the same color component as the specific color component and an image with color components other than the specific color component among the plurality of color components;
    a color conversion unit that performs color conversion of the image with color components other than the specific color component, separated by the separation unit; and
    a combination unit that combines the color-converted image with color components other than the specific color component, converted by the color conversion unit, and the specific color component image separated by the separation unit,
    wherein the combination unit includes a binary image transformation unit that transforms the image combined by the combination unit into a binary image.

2. The image processing device according to claim 1, further comprising a specific color conversion unit that performs color conversion of the specific color component image separated by the separation unit,
    wherein the combination unit combines the specific color component image color-converted by the specific color conversion unit and the color-converted image with color components other than the specific color component converted by the color conversion unit.

3. The image processing device according to claim 1,
    wherein the plurality of color components are four colors of cyan, magenta, yellow and black; and
    the specific color component is one color of black.

4. The image processing device according to claim 1, further comprising:
    a photographic image color conversion unit that performs color conversion of image information including only the first image having a plurality of color components; and
    a selection unit that selects whether to perform color conversion by the photographic image color conversion unit or to perform color conversion by the color conversion unit.

5. The image processing device according to claim 1, further comprising:
    a photographic image color conversion unit that performs color conversion of image information including only the first image having a plurality of color components;
    a judgment unit that judges whether or not input image information is image information including only the first image having a plurality of color components; and
    a setup unit that sets up that color conversion is performed by the photographic image color conversion unit, if the image information including only the first image having a plurality of color components is input, as judged by the judgment unit.

6. An image processing device, comprising a color conversion unit that performs color conversion of image information including a first image having a plurality of color components and a second image having a specific color component and to be overlaid at least in part on the first image,
    wherein the color conversion unit performs color conversion so as to avoid a hue difference between a region where the second image is not overlaid within the first image and a region where the second image is overlaid within the first image after the color conversion is performed by the color conversion unit.

7. The image processing device according to claim 6, further comprising:
   a photographic image color conversion unit that performs color conversion of image information including only the first image having a plurality of color components; and
   a selection unit that selects whether to perform color conversion by the photographic image color conversion unit or to perform color conversion by the color conversion unit.

8. The image processing device according to claim 6, further comprising:
   a photographic image color conversion unit that performs color conversion of image information including only the first image having a plurality of color components;
   a judgment unit that judges whether or not input image information is image information including only the first image having a plurality of color components; and
   a setup unit that sets up that color conversion is performed by the photographic image color conversion unit, if the image information including only the first image having a plurality of color components is input, as judged by the judgment unit.

9. An image output device that outputs an image based on image information in which color data has been converted by an image processing device which comprises:
   a separation unit that separates image information including a first image having a plurality of color components and a second image having a specific color component and to be overlaid at least in part on the first image into a specific color component image of the same color component as the specific color component and an image with color components other than the specific color component among the plurality of color components;
   a color conversion unit that performs color conversion of the image with color components other than the specific color component, separated by the separation unit; and
   a combination unit that combines the color-converted image with color components other than the specific color component, converted by the color conversion unit, and the specific color component image separated by the separation unit,
   wherein the combination unit includes a binary image transformation unit that transforms the image combined by the combination unit into a binary image.

10. An image forming system, comprising:
    an image processing device which includes:
    a separation unit that separates image information including a first image having a plurality of color components and a second image having a specific color component and to be overlaid at least in part on the first image into a specific color component image of the same color component as the specific color component and an image with color components other than the specific color component among the plurality of color components;
    a color conversion unit that performs color conversion of the image with color components other than the specific color component, separated by the separation unit; and
    a combination unit that combines the color-converted image with color components other than the specific color component, converted by the color conversion unit, and the specific color component image separated by the separation unit,
    an image output device that outputs an image based on image information in which color data has been converted by the image processing device; and
    a terminal device that transmits image information in which color data is not yet converted by the image processing device to the image processing device.

11. The image forming system according to claim 10, wherein the image processing device further includes:
    a photographic image color conversion unit that performs color conversion of image information for all colors in input image information with a plurality of colors; and
    a selection unit that selects whether to perform color conversion by the color conversion unit or to perform color conversion by the photographic image color conversion unit.

12. The image forming system according to claim 10, wherein the image processing device further includes:
    a photographic image color conversion unit that performs color conversion of image information for all colors in input image information with a plurality of colors;
    a judgment unit that judges whether or not input image information is image information including only the first image having a plurality of color components; and
    a setup unit that sets up that color conversion is performed by the photographic image color conversion unit, if the image information including only the first image having a plurality of color components is input, as judged by the judgment unit.

13. The image forming system according to claim 10, wherein the plurality of color components are four colors of cyan, magenta, yellow and black; and
    the specific color component is one color of black.

14. A terminal device that transmits image information in which color conversion is not yet performed by an image processing device to the image processing device which comprises:
    a separation unit that separates image information including a first image having a plurality of color components and a second image having a specific color component and to be overlaid at least in part on the first image into a specific color component image of the same color component as the specific color component and an image with color components other than the specific color component among the plurality of color components;
    a color conversion unit that performs color conversion of the image with color components other than the specific color component, separated by the separation unit; and
    a combination unit that combines the color-converted image with color components other than the specific color component, converted by the color conversion unit, and the specific color component image separated by the separation unit,
    wherein the combination unit includes a binary image transformation unit that transforms the image combined by the combination unit into a binary image.

15. The terminal device according to claim 14, including a transmitting unit that transmits, to the image processing device, the image information in which color conversion is not yet performed by the image processing device, together with its attribute information indicating whether or not input image information is image information including only the first image having a plurality of color components.

16. A computer readable medium storing a program causing a computer to perform a process comprising:

separating image information including a first image having a plurality of color components and a second image having a specific color component and to be overlaid at least in part on the first image into a specific color component image of the same color component as the specific color component and an image with color components other than the specific color component among the plurality of color components;

performing color conversion of the separated image with color components other than the specific color component;

combining the color-converted image with color components other than the specific color component, converted by the color conversion, and the separated specific color component image; and transforming the combined image into a binary image.

17. The computer readable medium storing the program according to claim 16, wherein the plurality of color components are four colors of cyan, magenta, yellow and black; and the specific color component is one color of black.

18. The computer readable medium storing the program according to claim 16, causing the computer to further perform a process comprising:

performing photographic image color conversion of image information including only the first image having a plurality of color components; and selecting whether to perform the photographic image color conversion or to perform the color conversion of the separated image.

19. The computer readable medium storing the program according to claim 16, causing the computer to further perform a process comprising:

performing photographic image color conversion of image information including only the first image having a plurality of color components;

judging whether or not input image information is image information including only the first image having a plurality of color components; and setting up that color conversion is performed by the photographic image color conversion, if the image information including only the first image having a plurality of color components is input, as judged.

* * * * *